United States Patent
Maekawa et al.

(10) Patent No.: US 11,249,454 B2
(45) Date of Patent: Feb. 15, 2022

(54) THERMAL DISPLACEMENT CORRECTION DEVICE CONSIDERING SENSOR FAILURE

(71) Applicant: FANUC CORPORATION, Yamanashi (JP)

(72) Inventors: Susumu Maekawa, Yamanashi (JP); Hirohide Tsunoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/262,919

(22) Filed: Jan. 31, 2019

(65) Prior Publication Data

US 2019/0235471 A1 Aug. 1, 2019

(30) Foreign Application Priority Data

Jan. 31, 2018 (JP) .............................. JP2018-015657

(51) Int. Cl.
*G05B 19/404* (2006.01)
*G05B 19/408* (2006.01)

(52) U.S. Cl.
CPC ......... *G05B 19/404* (2013.01); *G05B 19/408* (2013.01); *G05B 2219/49204* (2013.01); *G05B 2219/49207* (2013.01)

(58) Field of Classification Search
CPC ................ G05B 19/404; G05B 19/408; G05B 2219/49204; G05B 2219/49207; G05B 2219/35408; G05B 23/0297
USPC .................................. 700/193, 170, 159, 22
See application file for complete search history.

(56) References Cited

U.S. PATENT DOCUMENTS

| 5,523,953 | A | 6/1996 | Araie et al. | |
| 2005/0065744 | A1* | 3/2005 | Cataltepe | G05B 17/02 702/104 |
| 2008/0144693 | A1* | 6/2008 | Sato | G01K 15/00 374/1 |
| 2008/0270162 | A1* | 10/2008 | Machacek | G05B 23/0221 702/182 |

(Continued)

FOREIGN PATENT DOCUMENTS

| CN | 106371404 A | 2/2017 |
| CN | 106488828 A | 3/2017 |

(Continued)

*Primary Examiner* — Emilio J Saavedra
(74) *Attorney, Agent, or Firm* — Hauptman Ham, LLP (57) ABSTRACT

Provided is a thermal displacement correction device capable of continuing a thermal displacement correction with high accuracy even when some of a plurality of sensors fail. The thermal displacement correction device includes a sensor information acquisition unit that acquires machine tool temperatures detected by the sensor and a state of the sensors, a thermal displacement estimating method storage unit that stores a plurality of thermal displacement estimating methods, a thermal displacement estimating method selection unit that selects a thermal displacement estimating method to be used for estimating the thermal displacement amount of the machine tool based on the state of the sensors, and a thermal displacement estimating unit that estimates the thermal displacement amount of the machine tool based on the machine tool temperature according to the thermal displacement estimating method selected by the thermal displacement estimating method selection unit.

6 Claims, 5 Drawing Sheets

| No | STATE OF SENSOR 3 | THERMAL DISPLACEMENT AMOUNT CALCULATION FORMULA |
|---|---|---|
| 1 | ALL SENSORS CAN BE USED | $\Delta x = \alpha_1 T_1 + \alpha_2 T_2 + \alpha_3 T_3 + \alpha_4 T_4 + \alpha_5 T_5$ |
| 2 | SENSOR 3a CANNOT BE USED | $\Delta x = \beta_2 T_2 + \beta_3 T_3 + \beta_4 T_4 + \beta_5 T_5$ |
| 3 | SENSORS 3b AND 3c CANNOT BE USED | $\Delta x = \gamma_1 T_1 + \gamma_4 T_4 + \gamma_5 T_5$ |
| ... | ... | ... |

(56) References Cited

U.S. PATENT DOCUMENTS

| | | | |
|---|---|---|---|
| 2016/0001410 A1* | 1/2016 | Koyama | B23Q 11/0007 700/170 |
| 2016/0124420 A1* | 5/2016 | Murahashi | B23Q 11/0007 700/175 |
| 2017/0023417 A1 | 1/2017 | Koyama | |
| 2017/0185063 A1 | 6/2017 | Suzuki et al. | |
| 2017/0347506 A1* | 11/2017 | Kamio | H05K 13/089 |
| 2017/0359664 A1* | 12/2017 | Bhide | H05B 47/115 |

FOREIGN PATENT DOCUMENTS

| | | | |
|---|---|---|---|
| JP | H068107 A | | 1/1994 |
| JP | H0775937 A | | 3/1995 |
| JP | H11114776 A | | 4/1999 |
| JP | 2003094291 A | * | 4/2003 |
| JP | 2012139741 A | | 7/2012 |
| JP | 5336042 B2 | | 11/2013 |
| JP | 2015104765 A | * | 6/2015 |
| JP | 2015104765 A | | 6/2015 |

* cited by examiner

FIG.3A

| No | STATE OF SENSOR 3 | THERMAL DISPLACEMENT AMOUNT CALCULATION FORMULA |
|---|---|---|
| 1 | ALL SENSORS CAN BE USED | $\Delta x = \alpha_1 T_1 + \alpha_2 T_2 + \alpha_3 T_3 + \alpha_4 T_4 + \alpha_5 T_5$ |
| 2 | SENSOR 3a CANNOT BE USED | $\Delta x = \beta_2 T_2 + \beta_3 T_3 + \beta_4 T_4 + \beta_5 T_5$ |
| 3 | SENSORS 3b AND 3c CANNOT BE USED | $\Delta x = \gamma_1 T_1 + \gamma_4 T_4 + \gamma_5 T_5$ |
| ... | ... | ... |

THERMAL DISPLACEMENT CORRECTION DEVICE CONSIDERING SENSOR FAILURE

RELATED APPLICATIONS

The present application claims priority to Japanese Patent Application Number 2018-015657 filed Jan. 31, 2018, the disclosure of which is hereby incorporated by reference herein in its entirety.

BACKGROUND OF THE INVENTION

1. Field of the Invention

The present invention relates to a thermal displacement correction device, and more particularly to a thermal displacement correction device capable of continuing a thermal displacement correction with high accuracy even when some of a plurality of sensors fail.

2. Description of the Related Art

A technique for correcting a thermal displacement due to heat generation of a machine tool is offered in which the state of the machine tool is monitored by using a plurality of temperature sensors, and the thermal displacement amount of each part of the machine tool is estimated based on the state of the temperature of each part of the machine tool where the temperature is detected by each of the temperature sensors.

In the FA environment at the factory, due to cutting fluid used in machine tools and chips generated when machining the workpiece, abnormality is likely to occur in the sensor and the like, compared with that in the usual use environment, and the same applies to the temperature sensor used for a thermal displacement correction. When an abnormality occurs in the temperature sensor during the operation of the machine tool, it is impossible to correctly estimate the thermal displacement amount of each part of the machine tool.

In such a case, in the related art, countermeasures have been taken by a method such as prohibiting a change in the correction amount for correcting the thermal displacement at the time when it is determined that an abnormality has occurred in the temperature sensor (for example, JP 5,336,042 B1).

When the above-described conventional method is adopted, the thermal displacement correction based on the abnormal temperature sensor output is not performed. In other words, after the change in the correction amount is prohibited, the correction of the thermal displacement based on the operating state of the machine or the like is not performed. Therefore, there is a problem in that the quality of the machined product is lowered. In such a case, the operation of the machine tool is stopped at an appropriate timing, and the situation is restored by the maintenance of the temperature sensor where the abnormality has occurred. However, when the operation of the machine tool is stopped, the productivity is reduced. Therefore, a method of estimating the thermal displacement continuously and accurately even when an abnormality occurs in the temperature sensor is strongly desired.

It is an object of the present invention to provide a thermal displacement correction device capable of continuing a thermal displacement correction with high accuracy even when some of a plurality of sensors fail.

SUMMARY OF THE INVENTION

A thermal displacement correction device of the present invention is used when an abnormality occurs in a temperature sensor, and includes a plurality of thermal displacement estimating methods capable of estimating thermal displacement without using values detected by one or more temperature sensors. When an abnormality occurs in the temperature sensor, a thermal displacement estimating methods of not using the value detected by the temperature sensor in which the abnormality has occurred is selected from among a plurality of thermal displacement estimating methods, it is possible to continue the thermal displacement correction using the selected thermal displacement estimating method, thereby solving the above problem.

According to one aspect of the present invention, there is provided a thermal displacement correction device that estimates a thermal displacement amount of a machine tool based on temperatures of the machine tool, the temperatures being detected by a plurality of sensors. The thermal displacement correction device includes a sensor information acquisition unit that acquires the machine tool temperatures detected by the sensors and a state of the sensors, a thermal displacement estimating method storage unit that stores a plurality of thermal displacement estimating methods in association with the state of the sensors, a thermal displacement estimating method selection unit that selects a thermal displacement estimating method to be used for estimating the thermal displacement amount of the machine tool from among the plurality of thermal displacement estimating methods stored in the thermal displacement estimating method storage unit based on the state of the sensors acquired by the sensor information acquisition unit, and a thermal displacement estimating unit that estimates the thermal displacement amount of the machine tool based on the machine tool temperatures acquired by the sensor information acquisition unit according to the thermal displacement estimating method selected by the thermal displacement estimating method selection unit.

According to the present invention, even when an abnormality occurs in the temperature sensor, estimation and a correction of thermal displacement can be performed continually and it is possible to reliably estimate and correct thermal displacement without reducing the cycle time.

BRIEF DESCRIPTION OF THE DRAWINGS

The foregoing and other objects and features of the present invention will become apparent from the following description of embodiments with reference to the accompanying drawings. Of those figures.

DETAILED DESCRIPTION OF THE PREFERRED EMBODIMENTS

Hereinafter, embodiments of the present invention will be described with reference to the drawings.

Figure 1:
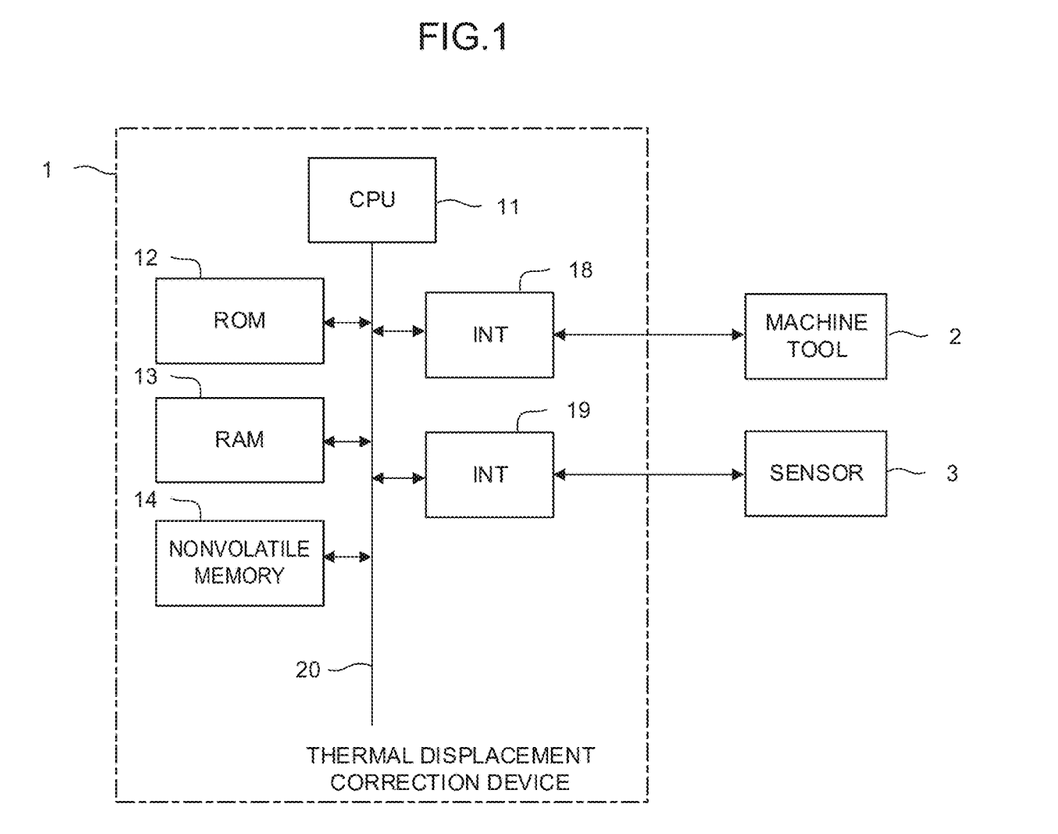
FIG. 1 is a schematic hardware configuration diagram showing a main portion of a thermal displacement correction device according to a first embodiment.

FIG. 1 is a schematic hardware configuration diagram showing a main portion of a thermal displacement correction device according to a first embodiment; A thermal displacement correction device 1 is implemented, for example, as a control device that controls a machine tool. Further, the thermal displacement correction device 1 is implemented as a computer such as a personal computer attached to a control device that controls the machine tool, a cell computer connected to the control device via a network, a host computer, a cloud server, or the like. FIG. 1 shows an example of the thermal displacement correction device 1 mounted as the control device that controls the machine tool.

A CPU 11 included in the thermal displacement correction device 1 according to the present embodiment is a processor that controls the thermal displacement correction device 1 as a whole. The CPU 11 reads a system program stored in a ROM 12 via a bus 20, and controls the entire thermal displacement correction device 1 according to the system program. Temporary calculation data and display data, various data input by an operator via an input unit (not shown), and the like are temporarily stored in a RAM 13.

A nonvolatile memory 14 is configured as a memory in which the storage state is maintained even when the power of the thermal displacement correction device 1 is turned off, for example, by being backed up by a battery (not shown). The nonvolatile memory 14 stores a control program read via an interface, a control program input via an input device (not shown) or the like, various data acquired from a machine tool 2 and a sensor 3, and the like. The control program stored in the nonvolatile memory 14 may be developed in the RAM 13 at the time of use. Various system programs necessary for the operation of the thermal displacement correction device 1 are written in advance in the ROM 12.

The thermal displacement correction device 1 outputs instructions to control each axis of the machine tool 2 to the machine tool 2 via an interface 18 based on a control program or the like. Further, the thermal displacement correction device 1 acquires data from respective parts of the machine tool 2 via the interface 18.

Further, the thermal displacement correction device 1 acquires data detected by sensors 3 (for example, a temperature sensor or the like) attached to the periphery or each part of the machine tool 2 via an interface 19. Although only one sensor 3 is shown in FIG. 1, actually, a plurality of sensors 3 is attached to respective parts of the machine tool 2, and is configured such that the thermal displacement correction device 1 can acquire the data detected by each sensor 3 (in the following, when indicating each of the plurality of sensors 3, the sensors are denoted as sensors 3a, 3b, 3c, . . . ).

Figure 2:
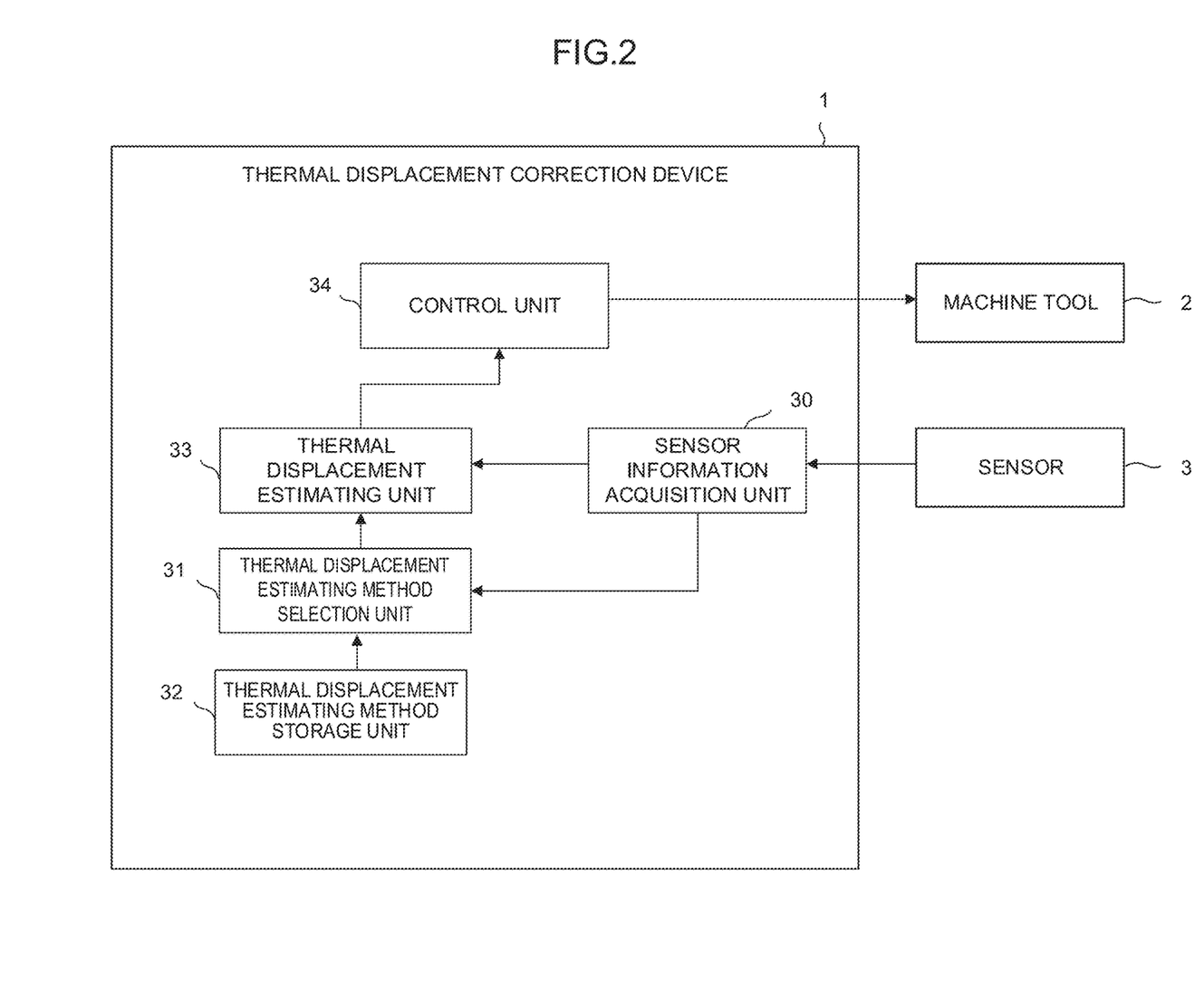
FIG. 2 is a schematic functional block diagram of the thermal displacement correction device according to the first embodiment.

FIG. 2 is a schematic functional block diagram of the thermal displacement correction device 1 according to the first embodiment. Each function of respective functional blocks shown in FIG. 2 is implemented by the CPU 11 provided in the thermal displacement correction device 1 executing a system program and controlling the operation of each part of the thermal displacement correction device 1.

The thermal displacement correction device 1 according to the present embodiment includes a sensor information acquisition unit 30, a thermal displacement estimating method selection unit 31, a thermal displacement estimating method storage unit 32, a thermal displacement estimating unit 33, and a control unit 34. The sensor information acquisition unit 30 acquires the temperature of the part of the machine tool 2 detected by each sensor 3 and the state of each sensor 3. The thermal displacement estimating method storage unit 32 stores the thermal displacement estimating method in advance. Based on the state of each sensor 3 acquired by the sensor information acquisition unit 30, the thermal displacement estimating method selection unit 31 selects a thermal displacement estimating method to be used for a thermal displacement estimation from the thermal displacement estimating methods stored in advance in the thermal displacement estimating method storage unit 32. A thermal displacement estimating unit 33 estimates the thermal displacement amount of the machine tool 2 based on the temperature of each part of the machine tool 2 acquired by the sensor information acquisition unit 30 according to the thermal displacement estimating method selected by the thermal displacement estimating method selection unit 31. The control unit 34 controls the operation of the machine tool 2 based on the control program stored in the nonvolatile memory 14 and the thermal displacement amount of the machine tool 2 estimated by the thermal displacement estimating unit 33.

The sensor information acquisition unit 30 acquires the temperature of the part of the machine tool 2 detected by each of the plurality of sensors 3 attached to respective parts of the machine tool 2. Further, the sensor information acquisition unit 30 acquires the state of each sensor 3 attached to respective parts of the machine tool 2. The state of each sensor 3 acquired by the sensor information acquisition unit 30 includes information as to whether each sensor 3 is operating normally. The state of the sensor 3 is acquired by using a known detection method of detecting, for example, a state in which the sensor 3 of which electrical connection is in an abnormal state (for example, disconnection has been detected, the potential state is not a normal potential state and the like.) indicates an unlikely temperature (for example, a sensor indicates a temperature at which detection is not normally made, indicates a value significantly different from the other sensors 3 and the like.). The sensor information acquisition unit 30 outputs the temperature of each part of the machine tool 2 and the state of the sensor 3 obtained in this manner to the thermal displacement estimating unit 33 and the thermal displacement estimating method selection unit 31.

The thermal displacement estimating method selection unit 31 selects a method of estimating the thermal displacement of the machine tool 2 based on the state of each sensor 3 acquired by the sensor information acquisition unit 30. The thermal displacement estimating method storage unit 32 stores in advance a plurality of thermal displacement estimating methods (for example, thermal displacement amount calculation formula) used when an abnormality occurs in some of the plurality of sensors 3. When an abnormality occurs in some of the sensors 3, the thermal displacement estimating method selection unit 31 selects a thermal displacement estimating method in which it is possible to estimate the thermal displacement amount of the machine tool 2 without using the value detected by the sensor 3 in which the abnormality has occurred from among the plurality of thermal displacement estimating methods stored in the thermal displacement estimating method storage unit 32.

The thermal displacement estimating method selection unit 31 outputs the selected thermal displacement estimating method to the thermal displacement estimating unit 33.

Figure 3A:
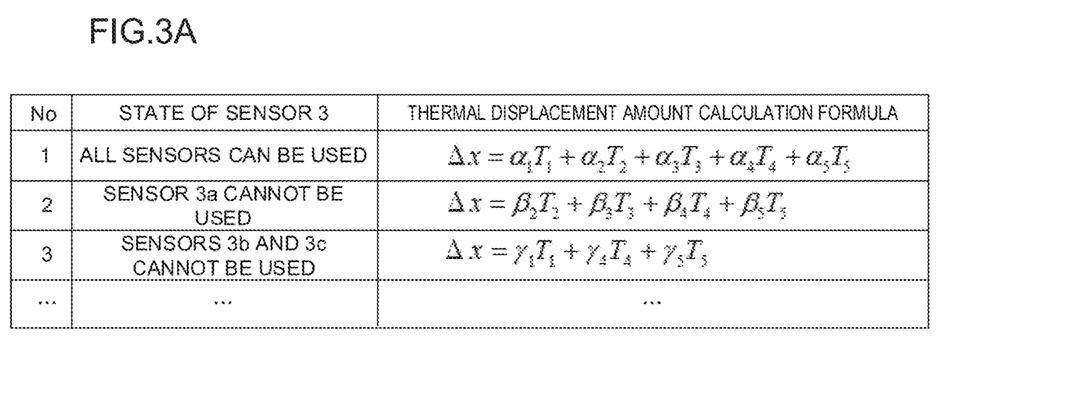
FIG. 3A is a diagram showing an example of a thermal displacement estimating method stored in a thermal displacement estimating method storage unit.
Figure 3B:
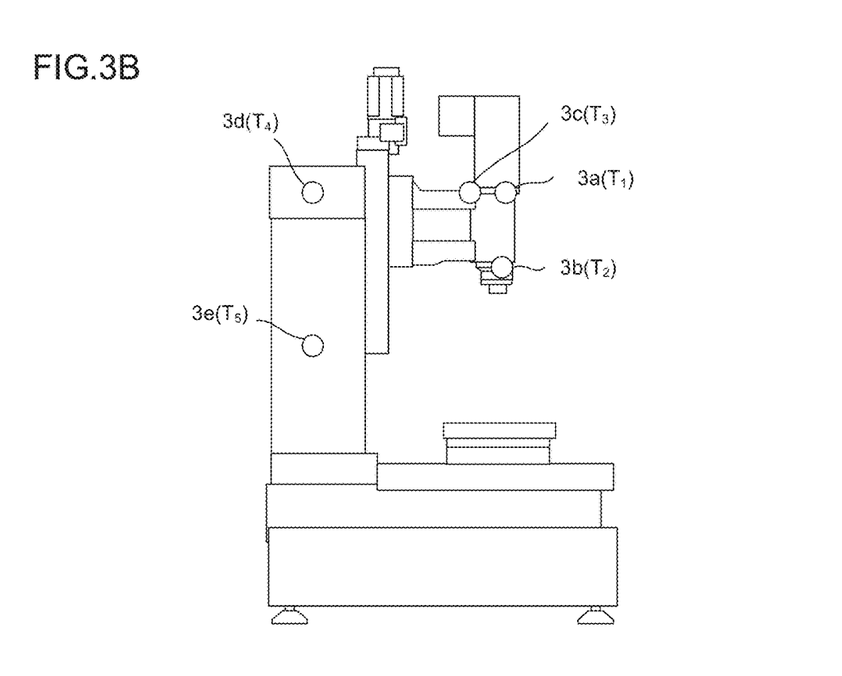
FIG. 3B is a diagram showing an example of sensors attached to a machine tool.

FIG. 3A shows an example of the thermal displacement estimating method stored in the thermal displacement estimating method storage unit 32, and FIG. 3B shows an example of the sensors 3 attached to the machine tool 2. In the examples shown in FIGS. 3A and 3B, the thermal displacement estimating method storage unit 32 stores in advance a plurality of thermal displacement amount calculation formulas associated with the state of the sensor 3. The thermal displacement amount calculation formula exemplified in FIG. 3A are formulas for calculating the thermal displacement amount Δx of the X-axis of the machine tool 2 when a temperature detected by each the plurality of sensors $3a$, $3b$, $3c$, $3d$, $3e$, . . . are $T_1$, $T_2$, $T_3$, $T_4$, $T_5$, . . . , respectively. In the example shown in FIG. 3A, only the formula for calculating the thermal displacement amount Δx of the X-axis of the machine tool 2 is shown, but when the machine tool 2 further includes a plurality of axes such as the Y-axis, and the Z-axis, the thermal displacement amount calculation formula for each axis is stored as the thermal displacement estimating method in association with the state of the sensor 3. The state of the sensor 3 in FIG. 3A shows which sensor can be used (or which sensor cannot be used) among the plurality of sensors ($3a$, $3b$, $3c$, $3d$, $3e$, . . . ). In the example shown in FIGS. 3A and 3B, when receiving the temperature of each part of the machine tool 2 and the state of each sensor 3 from the sensor information acquisition unit 30 in a state in which a plurality of thermal displacement amount calculation formulas is stored as thermal displacement estimating methods in the thermal displacement estimating method storage unit 32, the thermal displacement estimating method selection unit 31 selects a usable thermal displacement amount calculation formula based on the state of each sensor 3, and outputs the selected thermal displacement amount calculation formula to the thermal displacement estimating unit 33. For example, when the thermal displacement amount calculation formula shown in FIG. 3A is stored in the thermal displacement estimating method storage unit 32, if the sensor $3a$ is in an abnormal state, the thermal displacement amount calculation formula stored as No. 2 is selected. In the case where the thermal displacement amount calculation formula as illustrated in FIG. 3A is used as the thermal displacement estimating method, the coefficients ($\alpha_1$, $\alpha_2$, $\alpha_3$, $\alpha_4$, $\alpha_5$, $\beta_2$, $\beta_3$, $\beta_5$, $\beta_5$, $\gamma_1$, $\gamma_4$, $\gamma_5$ and the like) and the like may be obtained in advance through experiments or the like.

The thermal displacement estimating unit 33 estimates the thermal displacement amount of the machine tool 2 based on the temperature of each part of the machine tool 2 acquired by the sensor information acquisition unit 30 according to the thermal displacement estimating method selected by the thermal displacement estimating method selection unit 31, and outputs the estimation result to the control unit 34.

When each axis of the machine tool 2 is controlled based on the control program stored in the nonvolatile memory 14, the control unit 34 corrects the position of each axis based on the estimation value of the thermal displacement amount of each axis of the machine tool 2 received from the thermal displacement estimating unit 33, and controls the operation of each axis of the machine tool 2 based on the corrected result.

As a modification of the thermal displacement correction device 1, when the thermal displacement estimating method selection unit 31 selects a thermal displacement estimating method, the thermal displacement estimating method capable of estimating the thermal displacement amount of the machine tool 2 with higher accuracy in the current state may be selected in a case where a plurality of thermal displacement estimating methods can be selected in the current state.

Figure 4A:
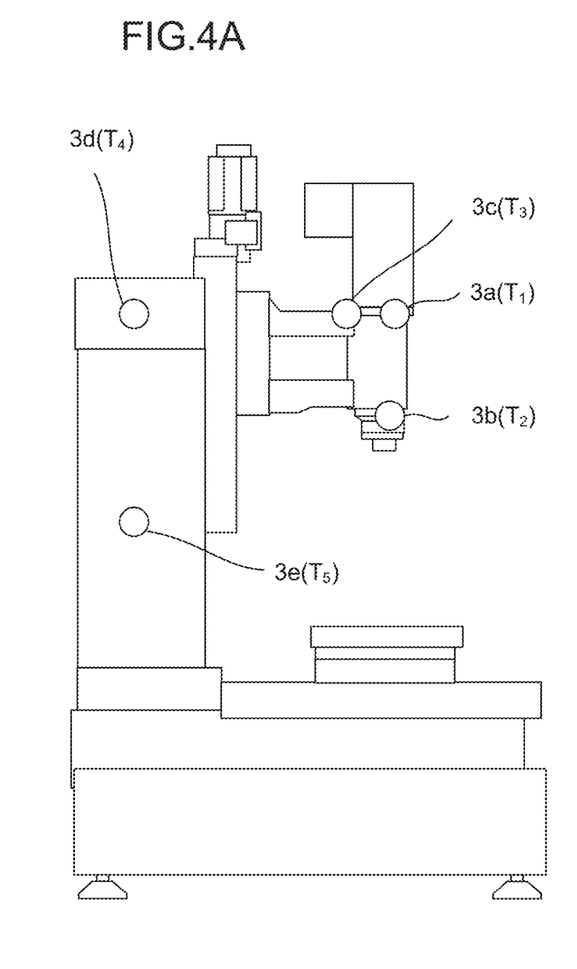
FIG. 4A is a left side view of a machine tool showing an example of sensors attached to the machine tool.
Figure 4B:
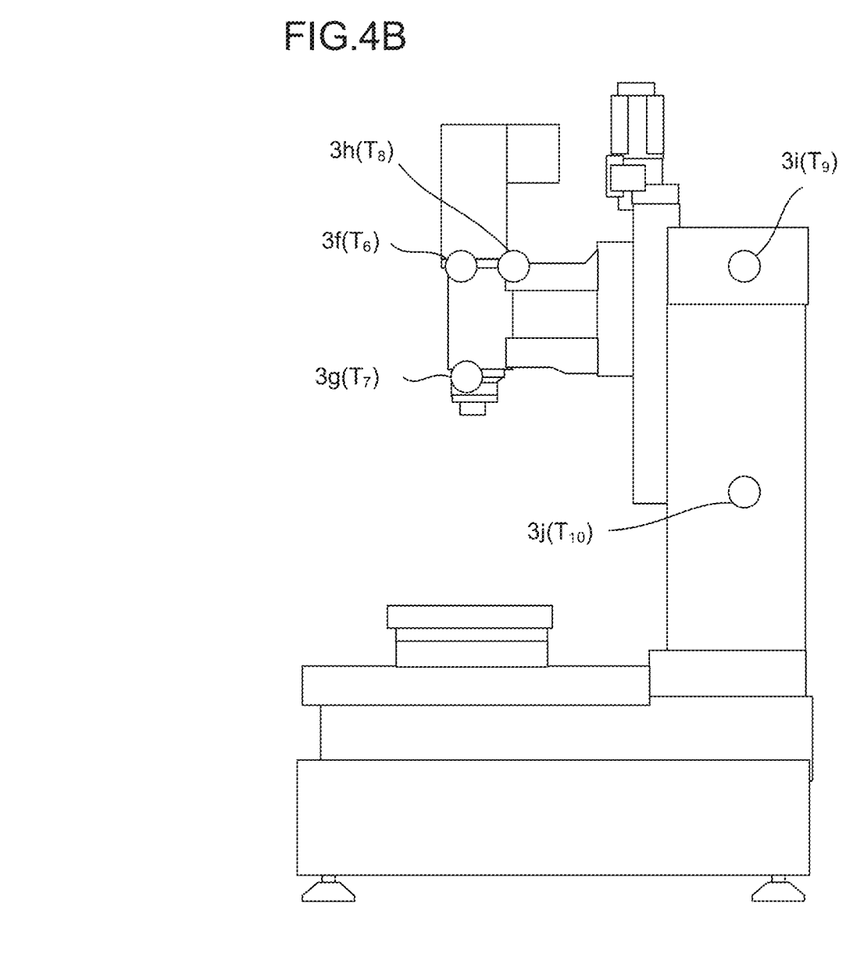
FIG. 4B is a right side view of the machine tool showing an example of the sensors attached to the machine tool.

For example, as illustrated in FIGS. 4A and 4B, as the number of sensors 3 (sensors $3a$ to $3i$) attached to the machine tool 2 increases, the number of the thermal displacement estimating methods stored in the thermal displacement estimating method storage unit 32 also increases. Some of the sensors 3 are installed symmetrically with respect to the machine, thereby resulting in a good effect on the estimation of the thermal displacement amount. For example, it is assumed that an abnormality occurs in the sensor $3j$ (detection value $T_{10}$) when the sensor $3e$ and the sensor $3j$ are installed symmetrically with respect to the machine in this case, the thermal displacement estimating method selection unit 31 selects the thermal displacement estimating method using the detection values detected by sensors $3a$ to $3d$, and $3f$-$3i$ except the sensor $3j$ and its mating sensor $3e$ instead of selecting the thermal displacement estimating method in which all the detection values $T_1$ to $T_9$ detected by the sensors $3a$ to $3i$ are used, whereby the thermal displacement estimating unit 33 may be able to estimate the thermal displacement amount of the machine tool 2 with higher accuracy. Depending on the structure of the machine tool 2, expansion and contraction of some members due to temperature change may have a large influence on one axis and not on the other axes. For this reason, instead of simply selecting the thermal displacement estimating method of using all the temperatures detected by the currently available sensors 3, the thermal displacement estimating method selection unit 31 may select a thermal displacement estimating method capable of estimating the thermal displacement amount with higher accuracy from among the thermal displacement estimating methods of not using the value detected by the sensor 3 in which the abnormality is detected depending on the structure of the machine tool 2, the arrangement of the sensor 3, the axis that estimates the thermal displacement amount, and the like.

As a method of selecting the thermal displacement estimating method by the thermal displacement estimating method selection unit 31 in this modification, for example, the thermal displacement estimating method used when an abnormality occurs is ranked in advance and the thermal displacement estimating method selection unit 31 may select the thermal displacement estimating method based on the ranked order. The ranking is performed based on the accuracy of the thermal displacement calculated using each thermal displacement estimating method when an abnormality occurs in the sensor 3. The thermal displacement estimating method selection unit 31 selects the thermal displacement estimating method having the highest ranking out of the thermal displacement estimating methods of not using the value detected by the sensor 3 in which the abnormality has occurred. For example, the ranking may differ depending on the axis of which thermal displacement amount is to be estimated by the thermal displacement estimating unit 33.

As another selection method, the thermal displacement estimating method selection unit 31 may select the thermal displacement correction method that has calculated a thermal displacement amount closest to the thermal displacement amount estimated when the temperature sensor is normal. The temperature detected by each sensor 3 when all the sensors 3 are normal, and the thermal displacement amount estimated by using the thermal displacement correction method of using the detection values of all the sensors 3 are stored in advance in a storage device as history data. When an abnormality occurs in the temperature sensor, the thermal displacement estimating unit 33 estimates the thermal displacement amount based on the temperature data stored as the history data for each of a plurality of thermal displacement estimating methods of not using the value detected by the sensor 3 in which the abnormality occurs, and the thermal displacement estimating method selection unit 31 selects a thermal displacement correction method in which a thermal displacement amount closest to the thermal displacement amount estimated by using the values detected by all the temperature sensors has been calculated.

Furthermore, as another selection method, when an abnormality occurs in the temperature sensor, the thermal displacement amount is measured by a measuring instrument such as a touch probe to obtain an actually measured value, and the thermal displacement estimating method selection unit 31 may select a thermal displacement correction method in which a result closest to the actually measured result has been calculated among a plurality of thermal displacement estimating methods of not using the value detected by the sensor 3 in which the abnormality has occurred.

As another modification of the thermal displacement correction device 1, the thermal displacement estimating method storage unit 32 that stores a plurality of thermal displacement estimating methods may be managed by a computer such as a cell computer on the network, a host computer, a cloud server or the like. When the number of the sensors 3 attached to the machine tool 2 is large, the number of the thermal displacement estimating methods stored in the thermal displacement estimating method storage unit 32 is increased, and the memory of the thermal displacement correction device 1 is pressed. Therefore, the thermal displacement estimating method is managed on the server or the like, and the thermal displacement estimating method is acquired via the network, so that the data stored in the memory on the thermal displacement correction device 1 is reduced. It is also possible to share the data with another thermal displacement correction device 1 via the network.

Figure 5:
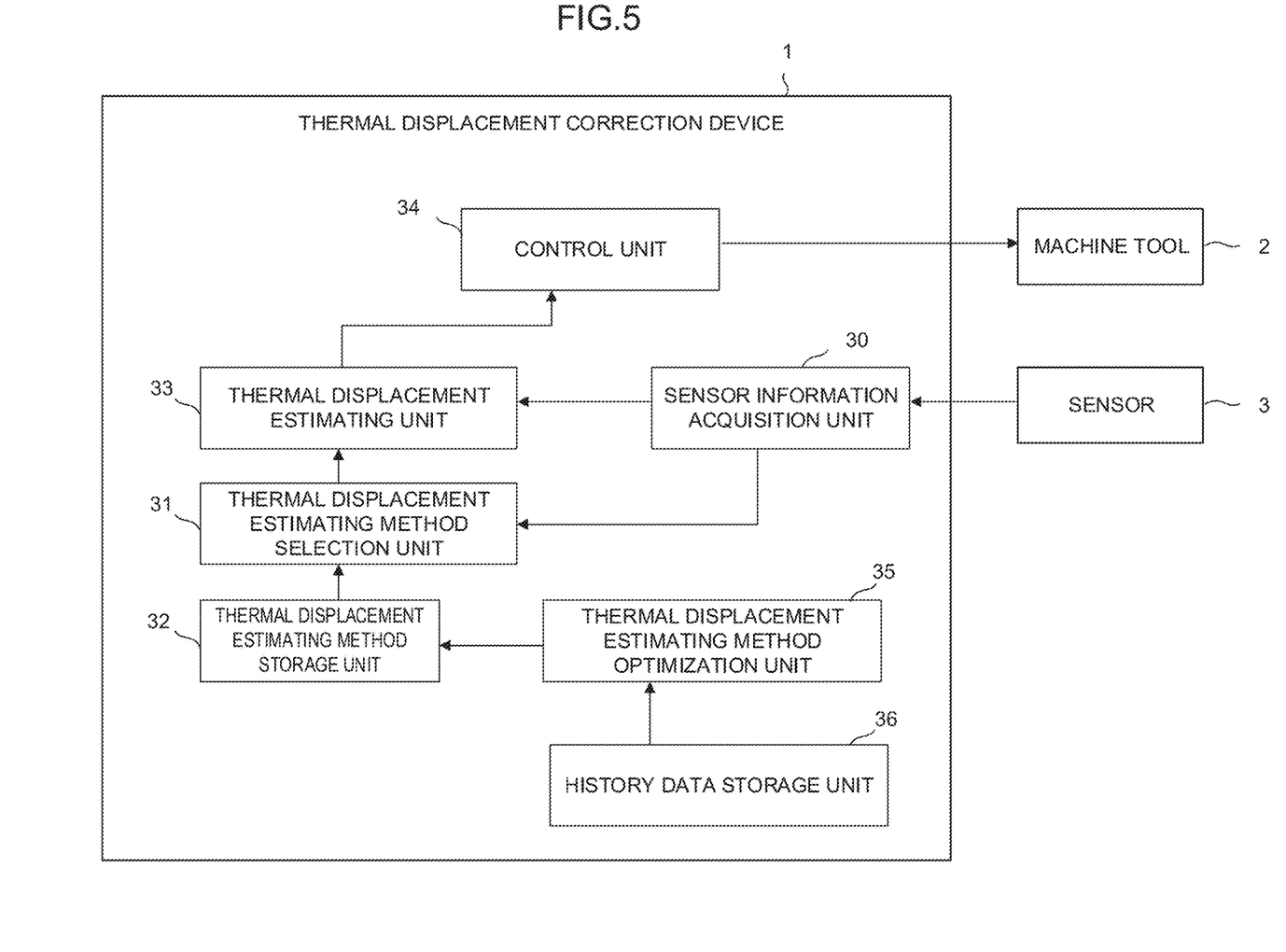
FIG. 5 is a schematic functional block diagram of a thermal displacement correction device according to a second embodiment.

FIG. 5 is a schematic functional block diagram of a thermal displacement correction device 1 according to the second embodiment. Unlike the thermal displacement correction device 1 according to the first embodiment, the thermal displacement correction device 1 according to the present embodiment further includes a thermal displacement estimating method optimization unit 35 that creates or optimizes a thermal displacement estimating method, and a history data storage unit 36 that stores data necessary for creating or optimizing the thermal displacement estimating method.

The thermal displacement estimating method optimization unit 35 is a function unit that creates or optimizes the thermal displacement correction method by using the information stored in the history data storage unit 36. The history data storage unit 36 stores history data prepared in advance or acquired while being machined using the machine tool 2. For example, the history data, for example, when machining is being performed using the machine tool 2 in a state where the sensors 3 is operating normally, may also include the temperatures of respective parts of the machine tool 2 detected by the sensors 3, and the thermal displacement of the machine tool 2 estimated by using all of the temperatures. Further, the history data, for example, when machining is being performed using the machine tool 2, may also include the temperature of the part of the machine tool 2 detected by each of the sensors 3, and the actually measured value of the thermal displacement amount measured by a measuring instrument such as a touch probe. Using the history data, the thermal displacement estimating method optimization unit 35 creates or optimizes the thermal displacement estimating method of not using the values detected by some of the sensors 3. As an example of creation or optimization of the thermal displacement estimating method performed by the thermal displacement estimating method optimization unit 35, the thermal displacement amount calculation formulas as shown in FIG. 3A are used as the thermal displacement estimating method, and when the measured value of the thermal displacement amount measured by the measuring instrument such as the touch probe or the like and the temperature of the part of the machine tool 2 detected by each of the sensors 3 are stored, as the history data, in the history data storage unit 36, the coefficients of each thermal displacement amount calculation formula may be adjusted using a method such as multivariate analysis based on the history data. Further, the thermal displacement estimating method optimization unit 35 may perform machine learning. In other words, the thermal displacement estimating method optimization unit 35 may output coefficients of the thermal displacement amount calculation formula using history data acquired during machining according to a learning model in which the value detected by the sensor 3 and the thermal displacement amount are input values and the coefficients of the thermal displacement amount calculation formula is an output value, and may change the thermal displacement amount calculation formula by the output coefficients.

As a modification of the thermal displacement correction device 1 in the second embodiment, the history data storage unit 36 that stores the history data may be managed by a computer such as a cell computer on a network, a host computer, a cloud server, or the like. In order to appropriately create or optimize the thermal displacement estimating method, a considerable number of history data are required, and the memory of the thermal displacement correction device 1 is pressed. Therefore, the server or the like manages the history data and the history data is acquired via the network, whereby the amount of data stored in the memory on the thermal displacement correction device 1 is reduced.

In addition, the thermal displacement correction device 1 can also share these data with another thermal displacement correction device 1 via the network.

Although the embodiments of the present invention have been described above, the present invention is not limited only to the examples of the above-described embodiments, and can be implemented in various modes by making appropriate changes.

For example, in the above-described embodiment, an example using a linear formula as the thermal displacement estimating method is shown, but depending on the structure of the machine tool 2 and the arrangement of the sensor 3, it is possible to use a quadratic formula or a cubic formula alternatively, another advanced arithmetic formula as the thermal displacement estimating method. The thermal displacement estimating method may use a machine learning device such as a neural network. In the case where the thermal displacement correction device 1 has sufficient performance, reliable thermal displacement correction is possible by using the thermal displacement estimating method capable of estimating the thermal displacement with high accuracy with respect to the structure of the machine tool 2 and the arrangement of the sensor 3.

Further, the thermal displacement correction device 1 of the above-described embodiment includes the control unit 34 because the embodiment is an example of being mounted as a control device that controls the machine tool 2, but, for example, in the case where the thermal displacement correction device 1 is implemented as a computer such as a personal computer attached to a control device, a cell computer connected to the control device via a network, a host computer, a cloud server, or the like, the control unit 34 is not necessarily an indispensable component. In this case, the thermal displacement correction device 1 may serve to transmit the thermal displacement of the machine tool 2 to the control device having the control unit 34.

Further, in the above-described embodiment, the thermal displacement estimating method selection unit 31 is configured to select one thermal displacement estimating method. After selecting a plurality of thermal displacement estimating method according to the current state of the sensor 3, the thermal displacement estimating unit 33 calculates the thermal displacement amount of the machine tool 2 according to each of the plurality of selected thermal displacement estimating methods. By using a known statistical method with respect to the plurality of calculated thermal displacement amounts of machine tool 2 (for example, obtaining the average value of the thermal displacement amounts of machine tool 2 where the thermal displacement amounts exclude the maximum value and the minimum value or the like), the thermal displacement amount of the machine tool 2 may be estimated.

Although the embodiments of the present invention have been described above, the present invention is not limited to the examples of the above-described embodiments, and can be implemented in other modes by making appropriate changes.

The invention claimed is:

1. A thermal displacement correction device for a machine tool based on machine tool temperatures detected by a plurality of sensors, the thermal displacement correction device comprising:
    a memory configured to store a plurality of thermal displacement estimating methods in association with a state of the plurality of sensors;
    and a processor configured to acquire the machine tool temperatures detected by the plurality of sensors and the state of the plurality of sensors, select a thermal displacement estimating method to be used for estimating a thermal displacement amount of the machine tool from among the plurality of thermal displacement estimating methods stored in the memory based on the acquired state of the plurality of sensors, estimate the thermal displacement amount of the machine tool based on the acquired machine tool temperatures according to the selected thermal displacement estimating method, correct a position of the machine tool based on the estimated thermal displacement amount, and control operation of the machine tool based on the corrected position, wherein the processor is configured to, in response to a state of at least one sensor of the plurality of sensors being abnormal, select, from among the plurality of thermal displacement estimating methods stored in the memory, a thermal displacement estimating method that estimates the thermal displacement amount of the machine tool without using the machine tool temperature detected by said at least one sensor of the plurality of sensors, each of the plurality of thermal displacement estimating methods is a calculation formula for calculating a respective thermal displacement amount of the machine tool from the machine tool temperatures detected by the plurality of sensors, respectively, the plurality of thermal displacement estimating methods stored in the memory includes multiple thermal displacement estimating methods each of which estimates the thermal displacement amount of the machine tool without using the machine tool temperature detected by said at least one sensor of the plurality of sensors, the multiple thermal displacement estimating methods without using the machine tool temperature detected by said at least one abnormal sensor are ranked in an order based on an accuracy of the thermal displacement amount of the machine tool being calculated in consideration of said at least one abnormal sensor, and the processor is configured to select, from among the multiple thermal displacement estimating methods without using the machine tool temperature detected by said at least one abnormal sensor, a thermal displacement estimating method based on the ranked order and the state of the plurality of sensors, wherein the plurality of sensors comprises a further sensor positioned symmetrically to said at least one abnormal sensor with respect to the machine tool, and the processor is configured to select, from among the multiple thermal displacement estimating methods without using the machine tool temperature detected by said at least one abnormal sensor, a thermal displacement estimating method that estimates the thermal displacement amount of the machine tool without using the machine tool temperature detected by the further sensor, based on the ranked order and the state of the plurality of sensors.

2. The thermal displacement correction device according to claim 1, wherein
    the processor is further configured to, based on history data acquired when a state of each of the plurality of sensors is normal,
        optimize a thermal displacement estimating method among the plurality of thermal displacement estimating methods stored in the memory, or
        create a new thermal displacement estimating method to be stored in the memory.

3. The thermal displacement correction device according to claim 1, wherein
    the processor is configured to, in response to the state of said at least one sensor of the plurality of sensors being abnormal, select, from among the plurality of thermal displacement estimating methods, the thermal displacement estimating method configured to estimate a thermal displacement amount closest to a thermal displacement amount included in history data acquired when a state of each of the plurality of sensors is normal based on the history data.

4. The thermal displacement correction device according to claim 1, wherein
    the processor is configured to, in response to the state of said at least one sensor of the plurality of sensors being abnormal, select, from among the plurality of thermal displacement estimating methods, the thermal displacement estimating method configured to estimate a thermal displacement amount closest to a thermal displacement amount obtained by measuring respective parts of the machine tool.

5. The thermal displacement correction device according to claim 1, wherein each of the plurality of thermal displacement estimating methods is performed by a machine learning device that outputs the thermal displacement amount of the machine tool from the machine tool temperatures.

6. The thermal displacement correction device according to claim 1, wherein
the multiple thermal displacement estimating methods without using the machine tool temperature detected by said at least one abnormal sensor are ranked in the order from highest to lowest based on the accuracy of the thermal displacement amount of the machine tool being calculated in consideration of said at least one abnormal sensor.

* * * * *